US007650346B2

(12) United States Patent
Henaire et al.

(10) Patent No.: US 7,650,346 B2
(45) Date of Patent: Jan. 19, 2010

(54) USER-DEFINED TYPE CONSISTENCY CHECKER

(75) Inventors: Mathieu Henaire, Bellevue, WA (US); Beysim Sezgin, Redmond, WA (US); Ramachandran Venkatesh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 269 days.

(21) Appl. No.: 11/097,602

(22) Filed: Apr. 1, 2005

(65) Prior Publication Data

US 2006/0225026 A1 Oct. 5, 2006

(51) Int. Cl.
G06F 17/30 (2006.01)

(52) U.S. Cl. .................. 707/100; 707/2; 707/4; 707/5; 707/6; 707/10; 705/44; 709/206

(58) Field of Classification Search .......... 707/6, 707/10, 2, 4, 5, 100; 705/44; 709/206
See application file for complete search history.

(56) References Cited

U.S. PATENT DOCUMENTS

| 5,437,027 | A  | * | 7/1995 | Bannon et al. ........ 707/103 R |
| 5,778,230 | A  | * | 7/1998 | Wimble et al. ............ 717/131 |
| 6,286,015 | B1 | * | 9/2001 | Govindarajan et al. ...... 707/201 |
| 6,697,794 | B1 | * | 2/2004 | Milby ........................... 707/2 |
| 6,701,345 | B1 | * | 3/2004 | Carley et al. ................ 709/205 |
| 6,708,186 | B1 | * | 3/2004 | Claborn et al. ............. 707/102 |
| 6,708,196 | B1 | * | 3/2004 | Atkinson et al. ............ 718/102 |
| 6,735,592 | B1 | * | 5/2004 | Neumann et al. ........... 707/101 |
| 7,225,201 | B1 | * | 5/2007 | Milby .................... 707/103 R |
| 2003/0204481 | A1 | * | 10/2003 | Lau ............................... 707/1 |
| 2005/0125401 | A1 | * | 6/2005 | Carr et al. ...................... 707/5 |
| 2006/0277214 | A1 | * | 12/2006 | Sluiman ................ 707/103 R |

\* cited by examiner

*Primary Examiner*—SyLing Yen
*Assistant Examiner*—Isaac M Woo
(74) *Attorney, Agent, or Firm*—Workman Nydegger (57) ABSTRACT

A system that facilitates checking the consistency of a user-defined data type in relation to a database environment. The invention can employ a user-defined type (UDT) storage format whereby values can be self-describing, including the runtime type of the value. The invention can take the type definition that is persisted in the metadata catalogs as a streaming input and generate a type-specific state machine thereafter. At every point in the checking process, the type-specific state machine can be aware of the next data type that is to be encountered in the check. Whenever an embedded UDT is encountered, the current type-specific state machine can be suspended and saved. The embedded UDT can be checked before proceeding. In this way, the complex check can be effected using memory space proportional to the number of levels in the UDT as opposed to the number of bytes in the object.

12 Claims, 8 Drawing Sheets

USER-DEFINED TYPE CONSISTENCY CHECKER

TECHNICAL FIELD

This invention is related to computer systems, and more particularly, to a system and/or methodology that analyzes and verifies the consistency of user-defined types within streaming data employed within storage environments.

BACKGROUND OF THE INVENTION

A database is a collection of related files or data that is created and managed by a database management system (DBMS) in a predefined format. For example, a DBMS can be arranged in tables that contain rows and columns. Queries can be constructed in accordance to a standard query language (e.g., structured query language (SQL)) in order to access content of a table in the database. Likewise, data can be input (e.g., imported) into the table via an external source. Today, a DBMS can manage any form of data including text, images, sound and video. In accordance therewith, database and file structures are determined by a software application.

Conventionally, a DBMS employs predefined simple data types which can refer to a category of variable that is determined by the kind of data stored in it. For example, integer, floating point, string, logical, date and binary are common simple data types. Recently, efforts have been directed to the utilization of a user-defined data type (UDT) to increase DBMS storage flexibility and management. More particularly, the functionality of a UDT affords developers and users the flexibility to create a UDT (e.g., via standard SQL statements), which are compatible with a particular database application.

Effectively, a UDT is a fundamental new database extensibility mechanism. Accordingly, the development of the UDT enables the modeling and manipulation of complex types within a storage environment (e.g., DBMS). Utilization of the UDT includes concepts such as inheritance, containment, and multi-valued embeddings.

Although efforts have been directed to new and novel storage formats for the UDT, a substantial need exists for a system and/or methodology of checking the consistency of values stored using such a format in an efficient way. In other words, a need exists for a system and/or methodology that detects inconsistent or corrupt values in scenarios such as a remote procedure call (RPC) (e.g., accepting new values from a client), conversion (e.g., from another type such as binary to UDT), distributed query (e.g., accepting values from a remote database or server), and database consistency checking tools.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention disclosed and claimed herein, in one aspect thereof, comprises a system that facilitates checking the consistency of a user-defined data type (UDT) in relation to a storage environment (e.g., database). Aspects of the invention employ a UDT storage format whereby values can be self-describing, including the runtime type of the value. Additionally, sites of the declared type, including columns, embedded fields, and collection members, can contain values of the declared type or any of its sub-types. As well, values can be arbitrarily large (e.g., up to 2 GB), and contain arbitrarily large varying-sized fields. A specific sequence in which fields are persisted for each UDT value can exist. Further, the domain of primitive values is independently checkable.

One aspect of the invention can receive the type definition that is persisted in the metadata catalogs as input and generate a type-specific state machine thereafter. At every point in the checking process, the type-specific state machine can be aware of the next data type that is to be encountered in the check. Whenever an embedded UDT is encountered, the current type-specific state machine can be suspended and saved. The embedded UDT can be checked before proceeding. In this way, the complex check can be effected using memory space proportional to the number of levels in the UDT as opposed to the number of bytes in the object.

In another aspect, the number of levels can be expected to be one to two orders of magnitude less than the number of bytes in the object. Additionally, by definition, such a check can be streaming, e.g., the check can be performed without waiting for the entire state of the object to be available, or without making a contiguous copy of the value.

In yet another aspect, glue code (e.g., intermediate code) can be generated and customized to check values for the particular type. This glue code can facilitate generating efficient code for cases where the runtime type of the value is significantly different from the declared type.

Still another aspect employs a mechanism that can retain the last N (where N is an integer) kinds of actual values that were encountered at a site that contains a declared type value. This mechanism can be similar in operation to a virtual machine environment that reduces the cost of virtual function calls. However, this aspect of the subject invention is a unique application of this functionality with respect to database value checks. The mechanism of this aspect can be based on the principle that most of the values in a particular call site are actually of a small set of subtypes even in deep and wide type hierarchies.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component can be, but is not limited to being, a process running on a processor, a processor, a storage device such as a hard disk drive, multiple storage devices (e.g., a drive utilizing an optical storage medium and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
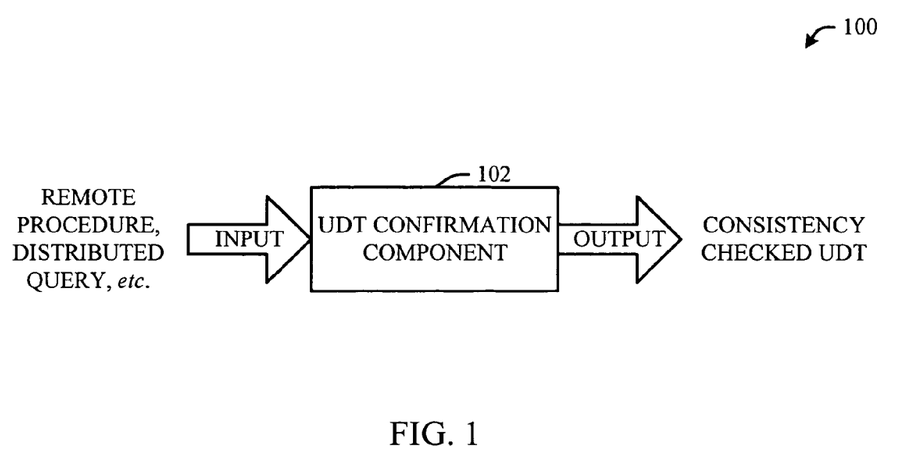
FIG. 1 illustrates a general component block diagram of a system that facilitates checking the consistency of a user-defined type (UDT) in accordance with an aspect of the subject invention.

Referring now to FIG. 1, there is illustrated a system 100 that facilitates user-defined type (UDT) consistency confirmation in accordance with an aspect of the subject invention. Generally, the system 100 can include a UDT confirmation component 102 that can receive an input and generate an output as illustrated.

As described supra, UDT categories of variables are a fundamental new database extensibility mechanism. Accordingly, UDT categories enable the modeling and manipulation of complex types within a storage environment including concepts such as inheritance, containment, and multi-valued embeddings. Recent efforts have been directed to implementing the UDT category classifications using a new and novel storage format. The subject invention describes a system and/or methodology to check the consistency of values stored using such a format (e.g., UDT format) in an efficient way.

The UDT confirmation component 102 of FIG. 1 can be employed to effect this consistency checking of the UDT value. Further, the UDT confirmation component 102 can be employed to verify the consistency of an input stream of data. Similar to the functionality of a parser or tokenizer, the subject invention can continuously monitor input streams of data and scan the input to determine if the input is a UDT, in which case the UDT confirmation component 102 is employed to verify the consistency of the received input with a declared type. It will be appreciated that the novel streaming consistency checking functionality described herein can increase performance and scalability of the invention.

One novel feature of the UDT confirmation component 102 of the invention is to detect inconsistent and/or corrupt values in scenarios such as remote procedure call (RPC), conversion, distributed query and vendor supplied database consistency checking tools. More particularly, in the case of RPC, the invention can confirm the consistency upon accepting new values from a client. Likewise, in the case of conversion, the invention can confirm consistency upon converting the data from another type (e.g., binary to UDT). A distributed query implementation of the invention can verify the consistency of the UDT upon accepting values from a remote database or server. These exemplary scenarios will be better understood upon a review of the drawings that follow. Moreover, it will be appreciated that the invention can be applied to the checking of other tree-oriented structures such as binary extensible markup language (XML) format or other complex formats.

It will be appreciated that a UDT value can be stored in any desired format. In one aspect, the format can include self-describing values. In other words, every value in the UDT, including the run-time value, can be self-describing. Additionally, sites of the declared type can contain values of the declared type or any of the declared type sub-types. These sites of the declared type can include columns, embedded fields and collection members.

In accordance with aspects of the invention, values can be arbitrarily large (e.g., up to 2 GB), and contain arbitrarily large varying sized fields. It will be understood that a specific sequence in which fields are persisted for each UDT value can be employed. Moreover, with reference to the UDT format, the domain of primitive values can be independently checkable.

Figure 2:
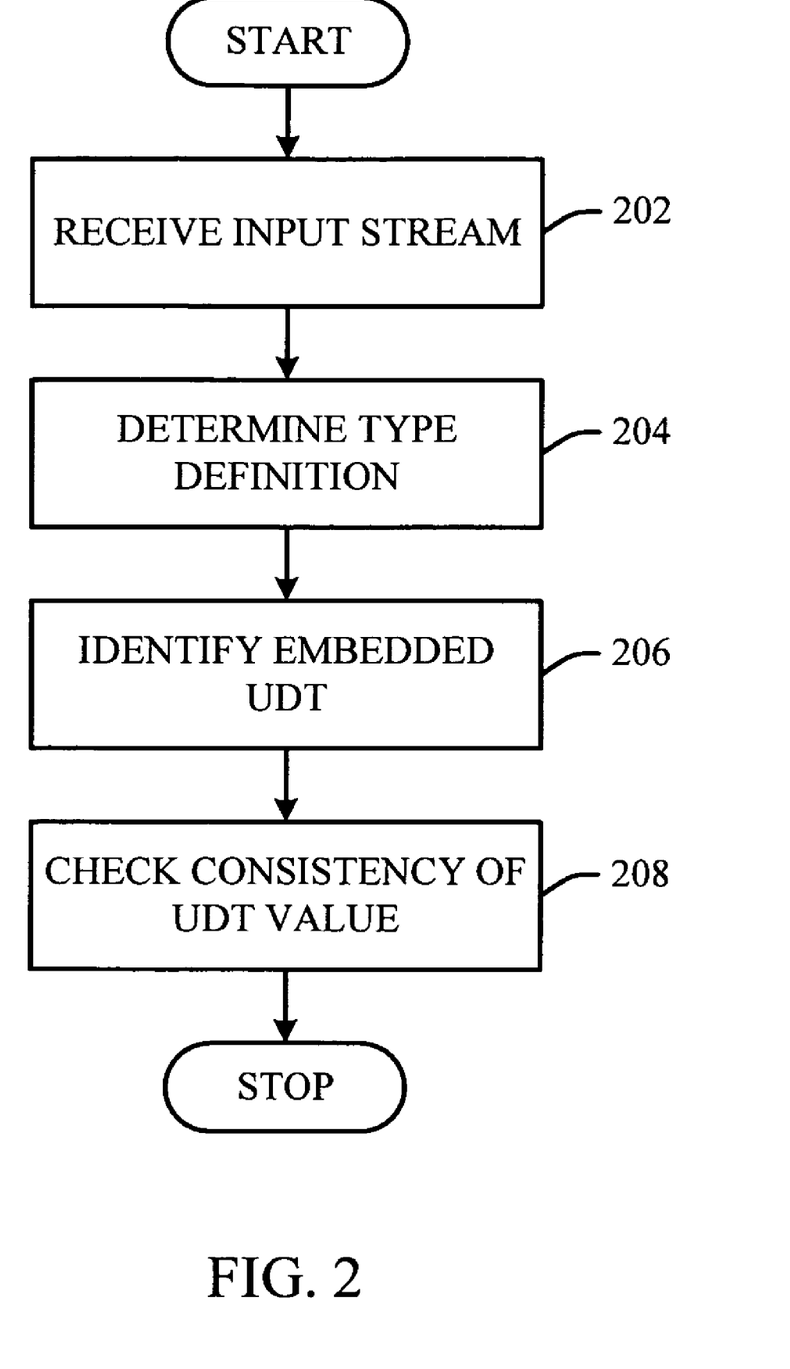
FIG. 2 illustrates a flow chart of procedures to check the consistency of a UDT in accordance with a disclosed aspect.

With reference to FIG. 2, there is illustrated a flow chart in accordance to an aspect of the with the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Referring again to FIG. 2, at 202, an input data stream is received. At 204, a type definition is determined. It will be appreciated that metadata can be employed to determine the definition of the declared type. Upon determination of the declared type(s), the invention can generate and employ a state machine to identify an embedded UDT within the input stream. It will be appreciated that the state machine, or more accurately, finite state machine can be a device and a technique that allows simple and accurate design of sequential logic and control functions. Here, the state machine can be employed to identify/predict a type that corresponds to the next portion of a data stream that should be checked.

In accordance therewith, an embedded UDT can be identified at 206. Once identified, the system can check the consistency of the identified UDT. As will be described in greater detail infra, glue code (e.g., intermediate language (IL) code) can be employed to check the consistency of the UDT value. As described supra, at 206, the system can continuously monitor the incoming stream to identify the embedded UDT.

Figure 3:
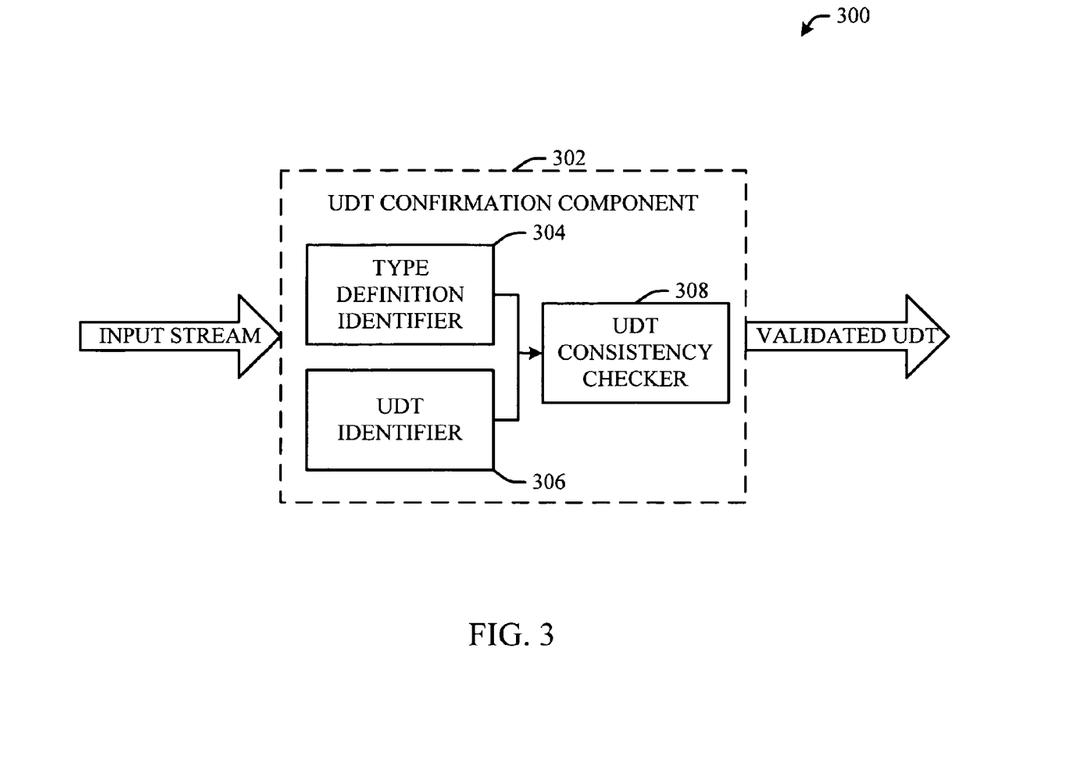
FIG. 3 illustrates a general component block diagram of a system having a type definition identifier component, a UDT identifier component and a UDT consistency checker in accordance with an aspect of the subject invention.

Turning now to FIG. 3, a system 300 that facilitates checking (e.g., validating) the consistency of a UDT is shown. Generally, the system 300 can include a UDT confirmation component 302 that receives a data stream as an input and generates a validated UDT as an output. More particularly, the UDT confirmation component 302 can include a type definition identifier component 304, a UDT identifier component 306 and a UDT consistency checker component 308.

Although the components and corresponding functionality are described with reference to individual components, it is to be understood and appreciated that the components and corresponding functionality, can be incorporated into common components. For example, the type definition identifier component 304 can be incorporated into a common component with the UDT identifier component 306. As well, the components shown can be remotely located from each other. By way of further example, the type definition identifier component 304 can be external from the UDT confirmation component 302.

Referring again to FIG. 3, the UDT confirmation component 302 can facilitate enabling the methodology described in FIG. 2. In operation, the UDT confirmation component 302 can receive an input whereby the type definition identifier component 304 can identify the type definition from metadata catalogs. As described supra, in an alternate aspect, the type definition identifier component 304 can be external to the UDT confirmation component 302. Accordingly, the UDT confirmation component 302 can receive the type definition as an input.

In view of the type definition, the UDT identifier component 306 can initiate the UDT consistency checker component 308 once an embedded UDT is identified. Thereafter, the UDT consistency checker component 308 can validate the consistency of the encountered UDT of the input stream. It is to be understood that a novel aspect of the invention is to validate the consistency of streaming input data.

Figure 4:
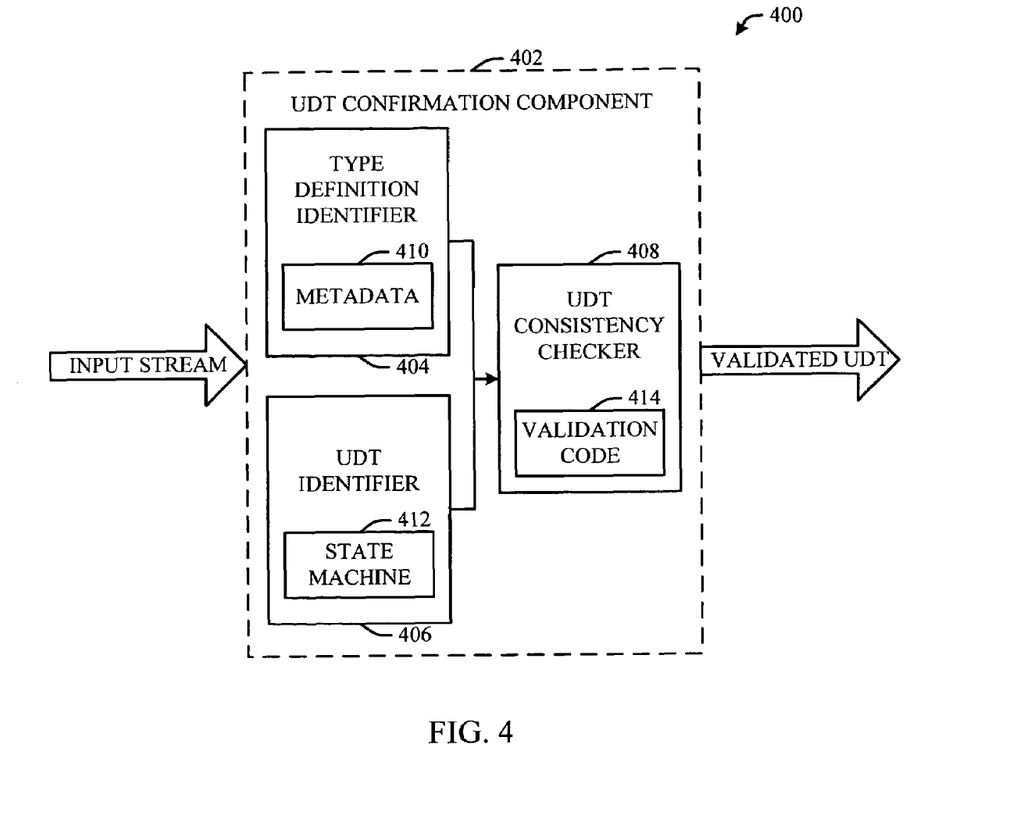
FIG. 4 illustrates a general component block diagram of a system that employs metadata, a state machine and validation code to effect checking the consistency of a UDT in accordance with an aspect of the subject invention.

Referring now to FIG. 4, a UDT consistency checking system 400 is shown. In particular, the system 400 can include a UDT confirmation component 402 (similar to the UDT confirmation component 302) having a type definition identifier component 404, a UDT identifier component 406, and a UDT consistency checker component 408. As described with reference to the previously disclosed aspects, the UDT confirmation component 402 can accept a streaming data input. Upon identification of an embedded UDT, the UDT confirmation component 402 can verify the consistency of the type with a predefined (e.g., declared) type.

In operation, the UDT consistency checker component 408 can take as input a type definition. This type definition can be identified by the type definition identifier component 404 via metadata 410. In other words, the type definition that is persisted in the metadata catalogs 410 can be identified and input into the UDT consistency checker component 408. In accordance therewith, a type-specific state machine 412 can be generated. Although FIG. 4 illustrates a single state machine 412, it is to be appreciated that any number of state machines can be generated in response to specific identified types.

At every point in the check process, the type-specific state machine 412 can be aware of the next data type that should be encountered in the check. Whenever an embedded UDT is encountered in the input stream, the current state machine 412 is suspended and saved. The embedded UDT can then be checked before proceeding. It is to be appreciated that, in this way, the complex check can occur using memory space proportional to the number of levels in the embedded UDT as opposed to the number of bytes in the object. Typically, the number of levels are expected to be one to two orders of magnitude less than the number of bytes in the object. However, it will be understood that the number of levels can be any proportion of the number of bytes in the object. Also, as described supra, by definition, such a check is streaming. In other words, the UDT check (e.g., consistency validation) can be performed without waiting for the entire state of the object to be available, or without making a contiguous copy of the value.

In one aspect, glue validation code 414 (e.g., IL) can be generated that is customized to check values for the particular type. This glue code can facilitate generation of efficient code even for cases where the runtime type of the value is significantly different from the declared type identified by the type definition identifier component 404.

In an alternate aspect, an optimization technique can be employed that retains information related to the last N kinds of actual values (where N is an integer) that were encountered from a source that contains a declared type value. Those skilled in the art will appreciate that this optimization can be analogized to the operation of virtual machine environments. More particularly, the optimization can be equated to the methodology employed by virtual machine environments to reduce the cost of virtual function calls. However, it is a novel application of this invention to perform database value checks. The optimization of the subject invention can be based on the principle that most of the values in a particular call site are actually of a small set of subtypes even in deep and wide type hierarchies.

Returning to the example, the stack that is used for validation can be "rented" to avoid allocating while checking a large set of values. Following are examples of metadata tables used to describe UDTs in accordance with an aspect of the invention.

1. Sys.assembly_types

| Column Name | DataType | Description |
| --- | --- | --- |
| base_type_id | int | The user_type_id of the original basetype |

2. sys.instantiated_types. This view "derives" from sys.types

| Column Name | DataType | Description |
| --- | --- | --- |
| generic_type_id | int | Type id of the generic type of which this type is an instantiation |

3. sys.type_parameters

| Column Name | DataType | Description |
| --- | --- | --- |
| instantiated_type_id | int | Type id of the instantiated type |
| parameter_ordinal | int | The ordinal of the parameter in the generic type definition |
| parameter_type_id | Int | The type id of the parameter |

4. sys.structured_type_fields

This catalog view exposes the structure of a Format.Structured UDT.

| Column Name | DataType | Description |
| --- | --- | --- |
| user_type_id | int | The user_type_id of the type of which this field is a declared number |
| Field_ordinal | int | The logical (1-based) ordinal of the field with the type |
| Name | Sysname | The name of the field |
| Field_user_type_id | Int | The user_type_id of the field type |
| Field_system_type_id | tinyint | The system_type_id of the field type |
| Max length | Smallint | Max length in bytes of the field |
| Precision | Tinyint | Precision of the field (if applicable) |
| Scale | Tinyint | Scale of field (if applicable) |
| Collation name | Sysname | Collation of field (if applicable) |
| Is_nullable | Bit | Nullability of field |

Figure 5:
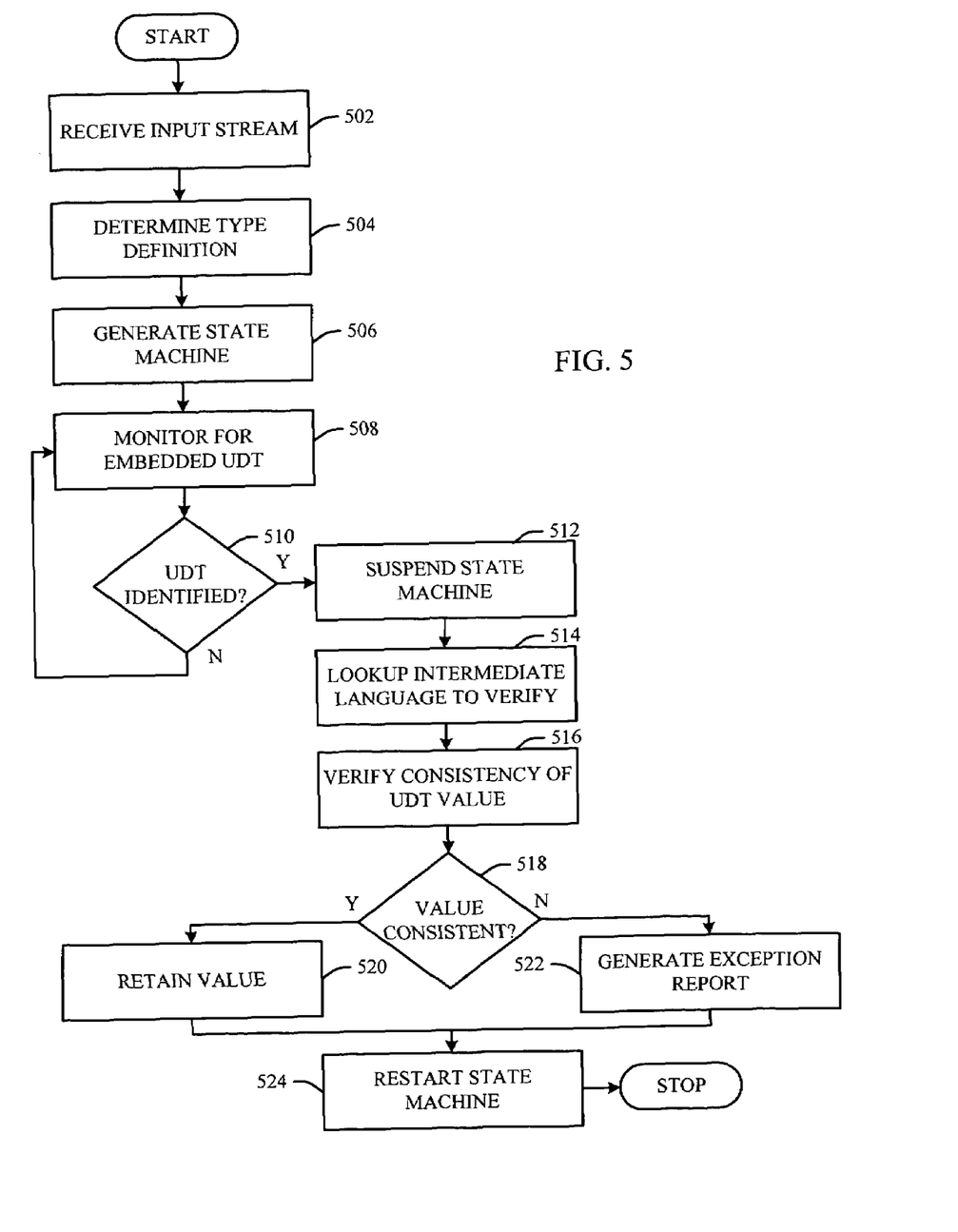
FIG. 5 illustrates a flow chart of procedures to check the consistency of a UDT in accordance with a disclosed aspect of the invention.

Referring now to FIG. 5, there is illustrated a methodology in accordance with the subject invention. At 502, an input stream is received. The type definition is determined at 504 whereby, at 506, a state machine is generated in accordance therewith. As described supra, metadata catalogs can be employed to determine the definition of the type. The state machine is initiated and at 508, the input stream can be monitored to identify embedded UDTs.

At 510, a determination is made with respect to whether a UDT is identified. If not, the system returns to 508 and waits for an embedded UDT. If at 510 an embedded UDT is identified, the state machine is suspended at 512 and the system proceeds to 514. At 514, IL is looked up that corresponds to the UDT. It will be appreciated that this IL can be employed to verify the consistency of the value with the UDT. At 516, the UDT value is verified for consistency.

At 518, a determination is made if the UDT value is consistent with a declared type. If the value is consistent with a declared type, the value is retained at 520. However, if the value is not consistent at 518, an exception is generated at 522. In either case, the state machine is restarted at 524. It is to be appreciated that the process shown in FIG. 5 can be repeated for additional received types. In another aspect, it will be appreciated that the input can be spooled prior to verifying the consistency of the UDT type based upon a type definition identified from metadata.

Figure 6:
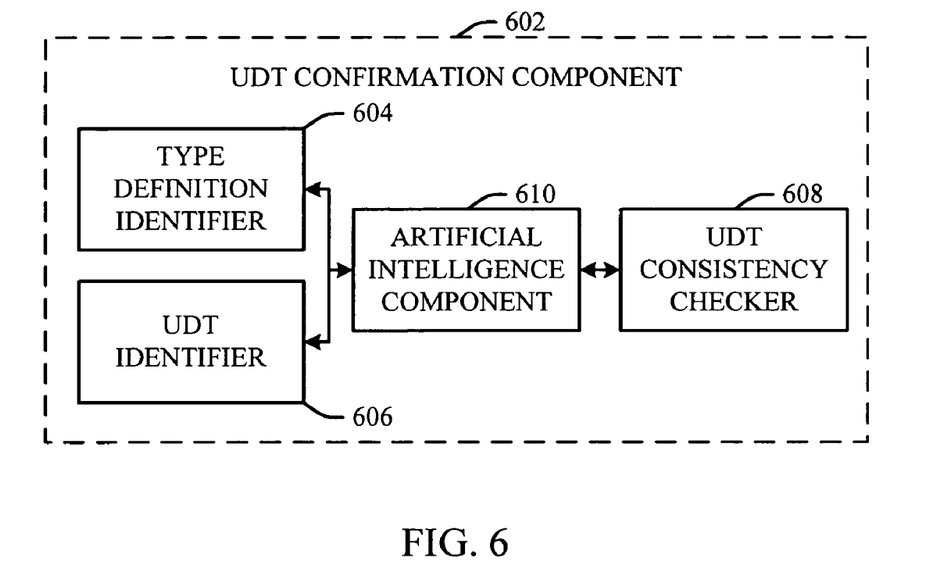
FIG. 6 illustrates a general component block diagram of an alternative UDT confirmation component that employs an artificial intelligence component in accordance with an aspect of the subject invention.

Referring now to FIG. 6, there is illustrated an aspect of a UDT confirmation component 602 in accordance with the subject invention. As described supra, the UDT confirmation component 602 can include a type definition identifier component 604, a UDT identifier component 606 and a UDT consistency checker component 608. Additionally, the UDT confirmation component 602 can include an artificial intelligence (AI) component 610 that facilitates automating functionality of the invention.

The subject invention (e.g., in connection with type definition, UDT identification, state machine generation) can employ various artificial AI-based schemes for carrying out various aspects thereof. For example, a process for determining criteria to generate a state machine can be facilitated via an automatic classifier system and process. Moreover, where the IL code for consistency checking is remotely located, the classifier can be employed to determine which IL to employ with respect to the embedded UDT.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVMs are configured via a learning or training phase within a classifier constructor and feature selection module. Thus, the classifier(s) can be used to automatically perform a number of functions, including but not limited to determining according to a predetermined criteria when and to what criteria a state machine is generated, when it is suspended (e.g., upon identification of an embedded UDT), when the state machine is to be restarted, etc.

In another aspect, AI component 610 can facilitate prediction the probability of consistency. For example, in the event that IL code does not recognize the identified embedded UDT, the AI component 610 can infer if an exception should be generated. It is to be further understood that the AI component 610 can be employed to effect a consistency determination in lieu of accessing IL code.

Figure 7:
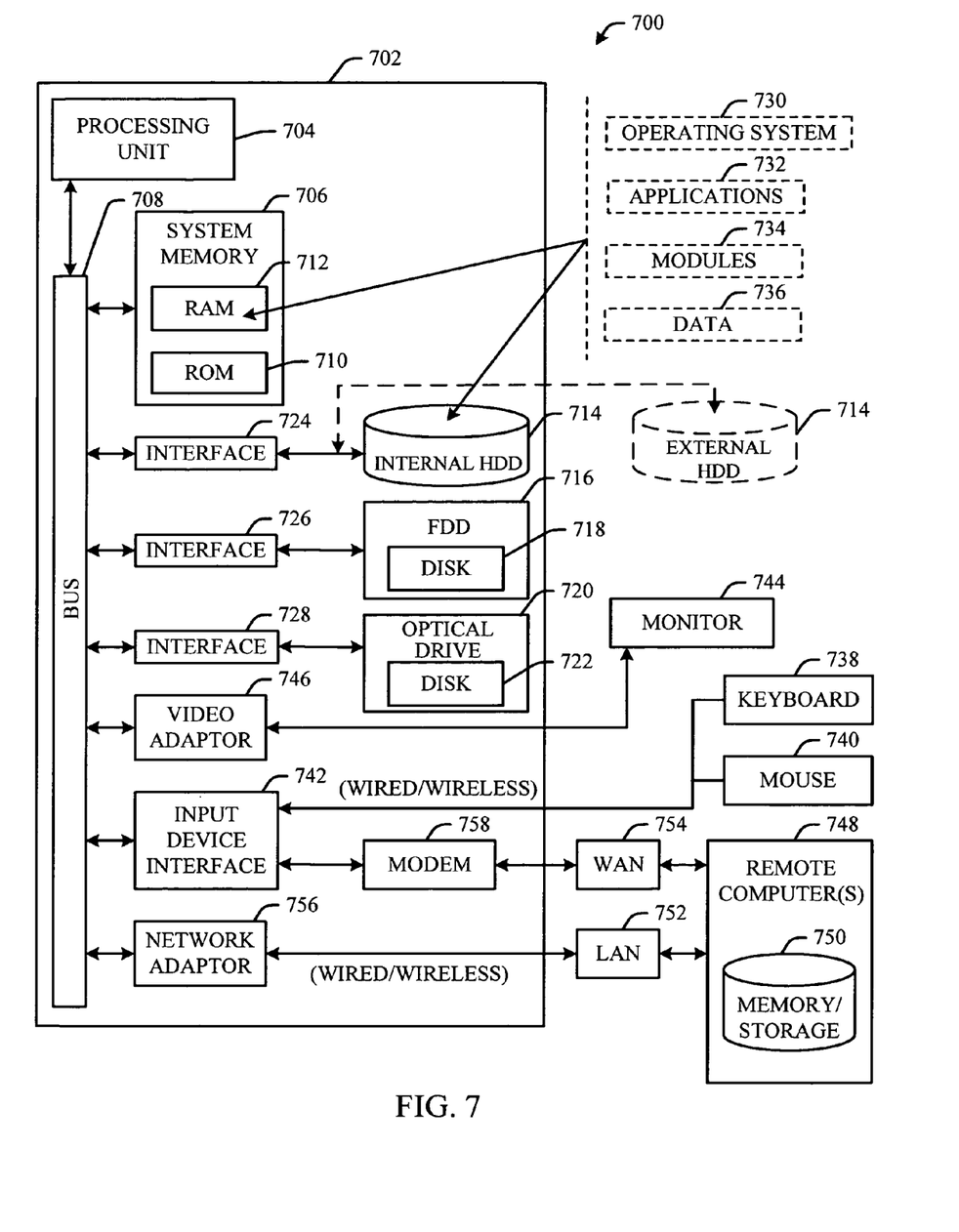
FIG. 7 illustrates a block diagram of a computer operable to execute the disclosed architecture.

Referring now to FIG. 7, there is illustrated a block diagram of a computer operable to execute the disclosed architecture. In order to provide additional context for various aspects of the subject invention, FIG. 7 and the following discussion are intended to provide a brief, general description of a suitable computing environment 700 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 7, there is illustrated the exemplary environment 700 for implementing various aspects of the invention that includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies.

The drives and their associated computer-readable media provide non-volatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary computing environment 700, and further, that any such media may contain computer-executable instructions for performing the methods of the subject invention.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the subject invention can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices, and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adaptor 756 may facilitate wired or wireless communication to the LAN 752, which may also include a wireless access point disposed thereon for communicating with the wireless adaptor 756. When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
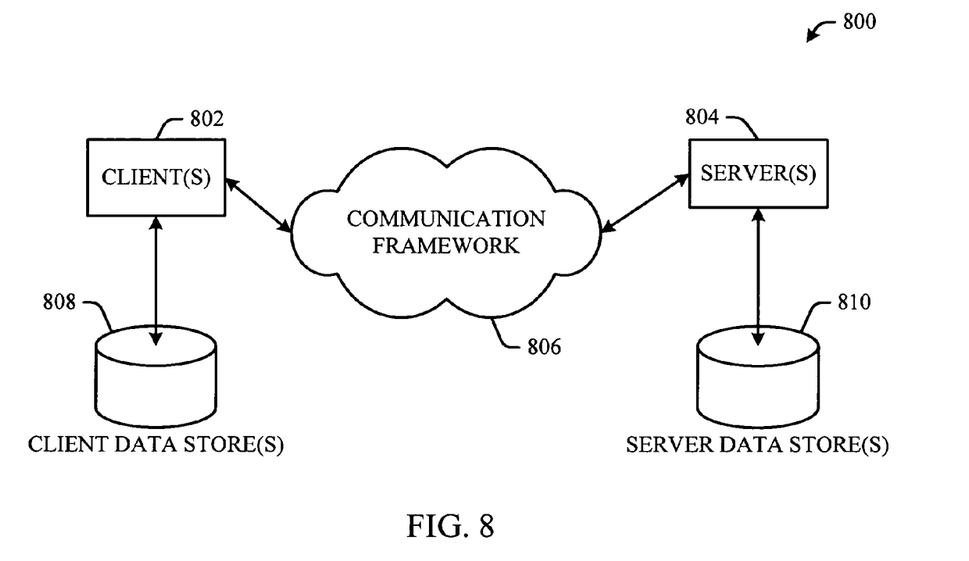
FIG. 8 illustrates a schematic block diagram of an exemplary computing environment in accordance with the subject invention.

Referring now to FIG. 8, there is illustrated a schematic block diagram of an exemplary computing environment 800 in accordance with the subject invention. The system 800 includes one or more client(s) 802. The client(s) 802 can be hardware and/or software (e.g., threads, processes, computing devices). The client(s) 802 can house cookie(s) and/or associated contextual information by employing the subject invention, for example. The system 800 also includes one or more server(s) 804. The server(s) 804 can also be hardware and/or software (e.g., threads, processes, computing devices). The servers 804 can house threads to perform transformations by employing the subject invention, for example. One possible communication between a client 802 and a server 804 can be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications can be facilitated via a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that checks consistency of data values comprising a computer processor for executing the following software components, the system comprising the following computer executable components:

a first component that receives incoming data values, wherein the incoming data values are received from at least one of a remote procedure call, conversion from a disparate type, a distributed query and a database consistency checking tool, and a type definition that is persisted in a metadata catalog, wherein the type definition defines declared types of the incoming data values;

a second component that generates a type-specific state machine based at least in part on the received type definition such that input streams of data are continuously monitored and scanned thereby determining if the input data is a user-defined type (UDT) and upon identification of an embedded UDT value in an input data stream, the second component suspends and saves the state machine; and a third component that uses generated intermediate code to check the consistency of the embedded UDT value with its declared type based at least on the type definition as determined from the metadata before the system proceeds such that consistency check occurs using a memory space that is proportional to the number of levels in the embedded UDT and without making a contiguous copy of the UDT value.

2. The system of claim 1, further comprising an artificial intelligence component that that facilitates generating the type-specific state machine as a function of a data source.

3. The system of claim 1, the type-specific state machine determines a next data type to be checked.

4. The system of claim 3, the next data type is checked before proceeding.

5. A method of verifying consistency of UDT data, comprising:

receiving an incoming stream of data values from a data source, wherein the incoming data values are received from at least one of a remote procedure call, conversion from a disparate type, a distributed query and a database consistency checking tool;

identifying a type definition that corresponds to declared type of the data value;

determining if the input stream comprises data values of the declared type by continuously scanning the input stream;

generating a type-specific state machine based at least in part on one or more identified type definitions;

identifying an embedded UDT structure and suspending and saving the state machine upon identification of the embedded UDT structure;

generating intermediate code that verifies the consistency of the embedded UDT structure;

verifying consistency of the embedded UDT structure with its declared type such that verifying consistency of the embedded UDT uses a memory space that is proportional to the number of levels in the embedded UDT and without making a contiguous copy of the UDT value; and resuming the state machine in response to the act of verifying the consistency of the embedded UDT structure.

6. The method of claim 5, the act of identifying the type definition comprises analyzing metadata associated with the incoming data value.

7. The method of claim 5, further comprising determining whether the received UDT structure is a corrupt value.

8. The method of claim 5, further comprising identifying a next data type that is encountered in the act of verifying.

9. The method of claim 5, further comprising generating new code from the intermediate code despite inconsistencies between a run-time data type and a declared data type for a specific received value.

10. The method of claim 5, further comprising employing an optimization technique that identifies a predetermined number of previously encountered data types from the data source.

11. A system that facilitates analyzing consistency of a UDT value comprising a computer processor for executing the following software components, the system comprising:

means for receiving an incoming stream of data elements from a source, wherein the incoming data elements are received from at least one of a remote procedure call, conversion from a disparate type, a distributed query and a database consistency checking tool;

means for analyzing metadata associated with the incoming data elements;

means for identifying a type definition that corresponds to the incoming data elements, wherein the type definition defines a defined data type;

means for generating a type-specific state machine based at least in part on one or more identified type definitions;

means for identifying an embedded UDT structure within the data element stream and suspending and saving the state machine upon identification of the embedded UDT structure; and means for verifying consistency of the embedded UDT structure with the defined type such that verifying consistency of the embedded UDT uses a memory space that is proportional to the number of levels in the embedded UDT and without making a contiguous copy of the UDT value.

12. The system of claim 11, further comprising means for generating an intermediate code that facilitates the means for verifying the consistency of the embedded UDT by utilizing a defined type with respect to structure.

* * * * *